(12) United States Patent
Adams

(10) Patent No.: US 7,213,699 B2
(45) Date of Patent: May 8, 2007

(54) ROTARY DISC CONVEYOR SYSTEM

(76) Inventor: Edward E. Adams, Box 326 Rt 10 North, Matheny, WV (US) 24860

(*) Notice: Subject to any disclaimer, the term of this patent is extended or adjusted under 35 U.S.C. 154(b) by 223 days.

(21) Appl. No.: 11/081,710

(22) Filed: Mar. 17, 2005

(65) Prior Publication Data
US 2005/0230225 A1  Oct. 20, 2005

Related U.S. Application Data

(60) Provisional application No. 60/555,711, filed on Mar. 24, 2004.

(51) Int. Cl.
B65G 29/00 (2006.01)

(52) U.S. Cl. .................... 198/608; 198/642; 198/745; 198/735.2

(58) Field of Classification Search ............ 198/608, 198/612, 624, 642, 743, 745, 735.2, 735.6, 198/860.2, 518
See application file for complete search history.

(56) References Cited

U.S. PATENT DOCUMENTS

| | | | |
|---|---|---|---|
| 842,056 A | 1/1907 | Barr | |
| 1,570,652 A * | 1/1926 | Townsend | ................... 198/624 |
| 2,415,201 A | 2/1947 | Zademach et al. | |
| 3,061,074 A | 10/1962 | Musschoot | |
| 3,125,210 A | 3/1964 | Sheetz | |
| 3,209,925 A * | 10/1965 | Coenen | ...................... 198/608 |
| 3,360,104 A | 12/1967 | Winfield | |
| 3,848,724 A | 11/1974 | Belk | |
| 4,056,189 A | 11/1977 | Freed, Jr. | |
| 4,078,649 A | 3/1978 | Prydtz | |
| 4,150,520 A | 4/1979 | Palmieri et al. | |
| 4,159,055 A * | 6/1979 | Eberle | ........................ 198/518 |
| 4,662,508 A | 5/1987 | Inoue et al. | |
| 4,671,707 A | 6/1987 | Vancelette et al. | |
| 4,747,250 A * | 5/1988 | Rossi | .......................... 53/511 |
| 4,799,585 A * | 1/1989 | Gysi | .......................... 198/743 |
| 5,535,999 A | 7/1996 | Ford | |
| 5,634,545 A | 6/1997 | Plumley | |
| 5,927,468 A | 7/1999 | Corniani et al. | |
| 2002/0096934 A1 | 7/2002 | Seear et al. | |

FOREIGN PATENT DOCUMENTS

| | | |
|---|---|---|
| DE | 3726450 | 3/1989 |
| JP | 58-100033 | 6/1983 |

* cited by examiner

Primary Examiner—James R. Bidwell
(74) Attorney, Agent, or Firm—Richard C. Litman

(57) ABSTRACT

The rotary disc conveyor system is formed of a series of units or pans linked together to form a continuous conveyor run. Each of the pans preferably includes a pair of rotary discs thereon, with all of the discs of the system rotating simultaneously and unidirectionally to convey material along the conveyor run. Each disc includes a series of generally radially disposed vanes thereon, to assist in sweeping the material along the conveyor. Guides may be installed along either side of the system, between each disc, to facilitate material flow and restrict return flow. Mechanical, hydraulic, or electrical power may be used to provide rotation of the discs. The rotary disc conveyor is particularly well suited for use in longwall coal mining for removing loose coal from the mining head and conveying it along the face of the wall to another transport system for removal from the mine.

19 Claims, 7 Drawing Sheets

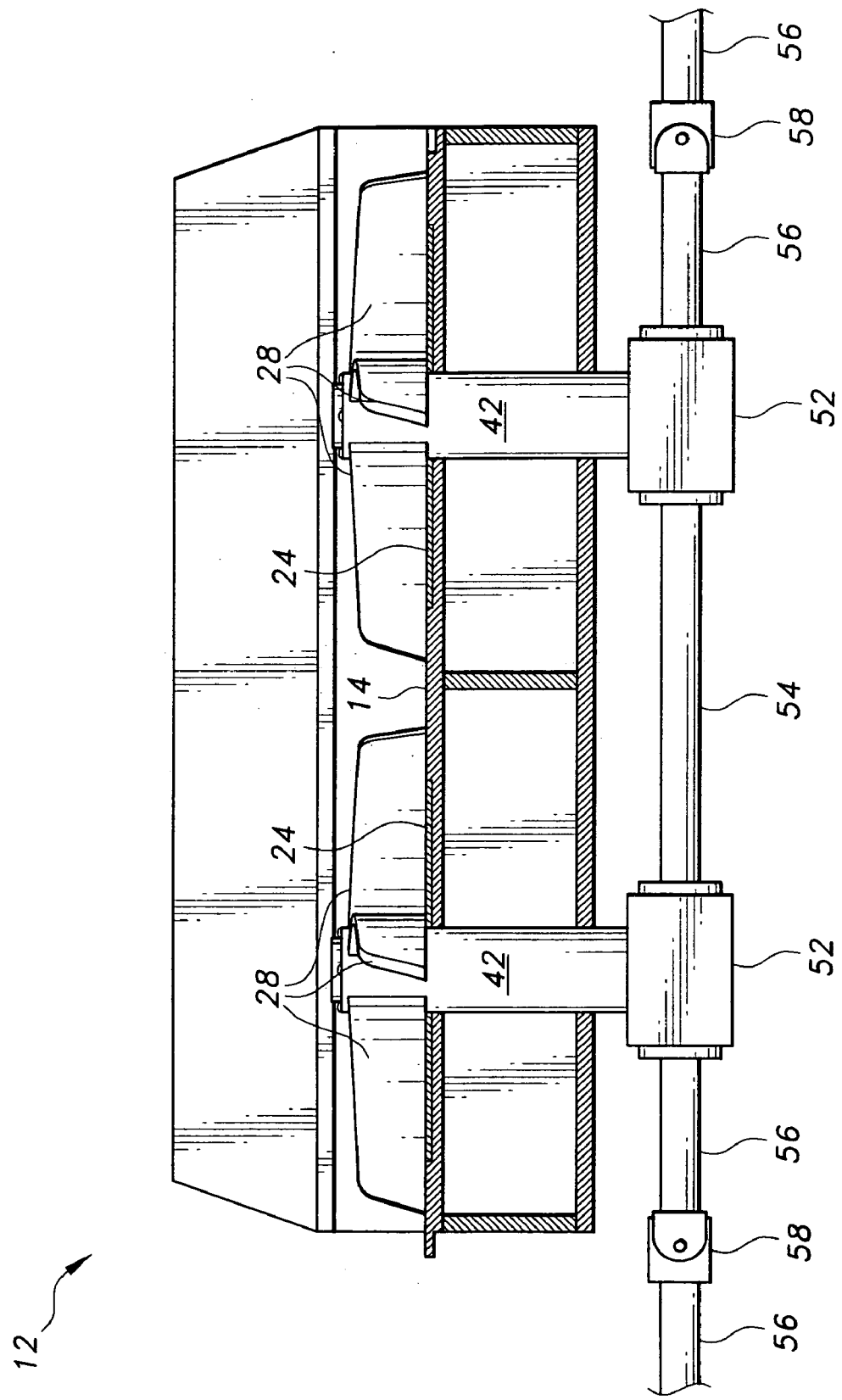

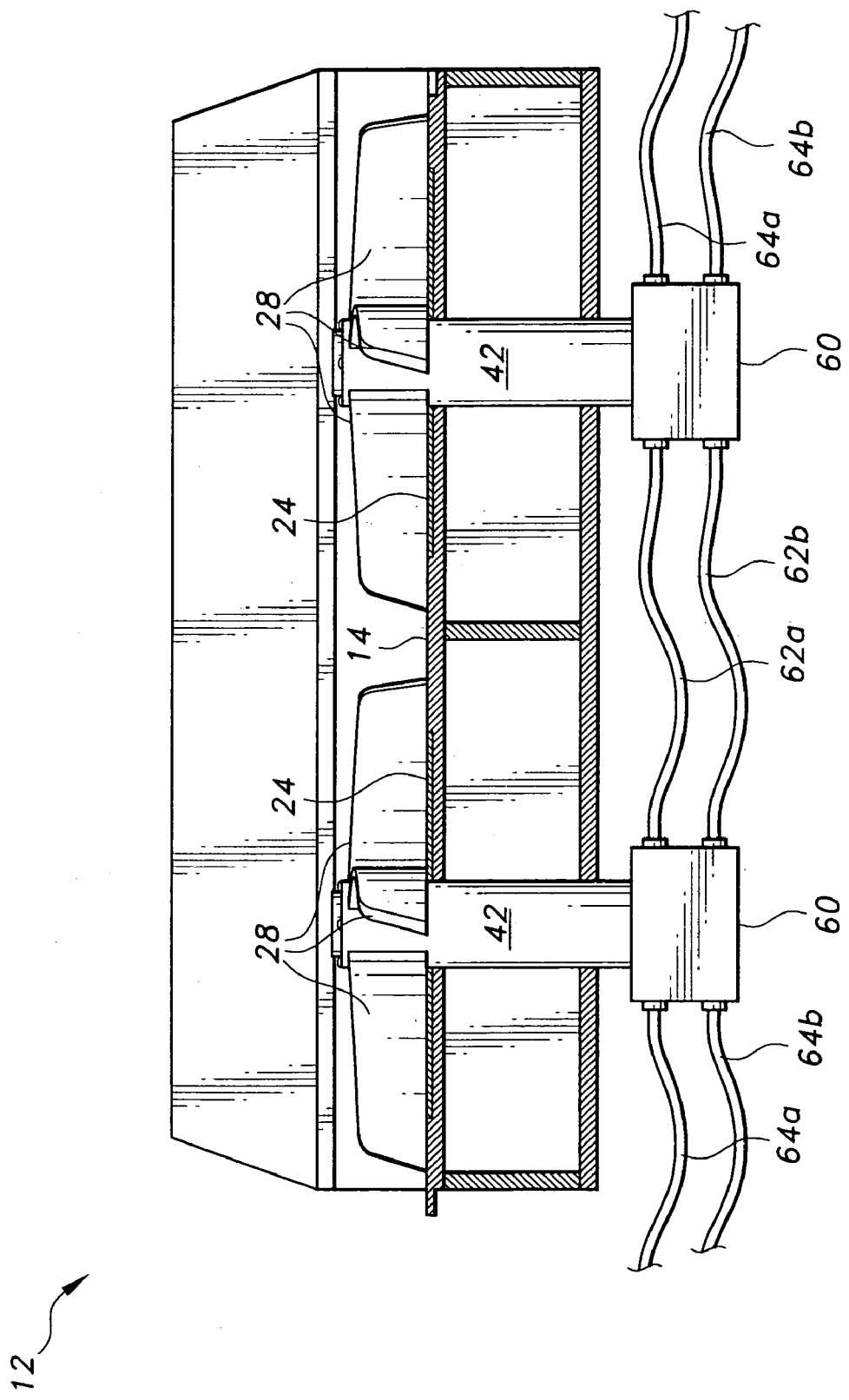

ROTARY DISC CONVEYOR SYSTEM

CROSS-REFERENCE TO RELATED APPLICATION

This application claims the benefit of U.S. Provisional Patent Application Ser. No. 60/555,711, filed Mar. 24, 2004.

BACKGROUND OF THE INVENTION

1. Field of the Invention

The present invention relates generally to powered conveyor systems for continually transferring material from one point to another, particularly in the longwall coal mining industry. More particularly, the present invention comprises a conveyor system formed of a series of relatively short units which may be assembled together, with each unit containing a pair of rotary discs therein. Power is provided for rotating the discs, with the rotation of the discs transferring material from disc to disc along the conveyor run.

2. Description of the Related Art

Powered conveyor systems have universal application in the continuous transfer of material from one point to another, and have long been used in a number of different industries and environments. Most such conventional conveyor systems utilize a flat belt or belts driven by powered rollers, to convey the material from one point to another. Generally, this principle has proven to be reasonably durable and reliable for the conveyance of most goods and materials.

However, such conventional conveyor systems are pushed to the limit of their reliability when installed in some relatively harsh environments. An example of such is the coal mining industry, particularly in longwall underground mining. The longwall mining technique has been developed relatively recently, i.e., in the past few decades. In longwall mining, a mining machine advances laterally along the face of the coal seam, which may be on the order of a thousand feet in length. A longwall face conveyor system extends behind the mining machine, and parallel to the face of the seam and travel of the mining machine. Conventional longwall face conveyor systems are powered by endless runs of conventional link chains, and operate continuously to transfer tons of coal from the mining machine to the end of the longwall face and conveyor run, where the coal is transferred to another conveyor or to a coal skip for transport to the surface.

The problem with conventional chain driven conveyor systems is that even though they are constructed of extremely sturdy materials, they are still prone to shutdown primarily due to breakage of links in the chain drive mechanism. When a single link breaks, the conveyor line is shut down, which shuts down the entire mining operation until the conveyor system is repaired. Considering the lost time when such a conveyor system is down for maintenance and/or repair, and the expense of repairing such systems underground, it can cost a mining operation on the order of two million dollars per year to repair and maintain a longwall face conveyor having a one thousand foot run.

The present invention provides a solution to this problem by means of a longwall face conveyor system utilizing a completely different principle of operation. The present conveyor system is formed of a series of separate units or pans, with each pan preferably containing a pair of vaned rotary discs thereon. The pans are linked together to form a conveyor run of the desired length. The rotary discs may be powered by any of a number of different means, e.g., roller chain and sprocket assemblies, rotary shafts extending between each pan and disc, or electric or hydraulic motors, etc. The present rotary disc conveyor system is considerably more durable than conventional link chain driven conveyor systems, resulting in far less down time for the conveyor line. The present rotary disc conveyor system is particularly well suited for use in longwall coal mining, as noted further above, but may be used in virtually any environment where conventional conveyor systems are used.

A discussion of the related art of which the present inventor is aware, and its differences and distinctions from the present invention, is provided below.

U.S. Pat. No. 842,056 issued on Jan. 22, 1907 to John C. Barr, titled "Circular Floor Conveyor," describes various embodiments of such circular conveyor systems. One embodiment incorporates multiple circular conveyors, but the conveyors include high peripheral walls and are separated into compartments by radial walls. These conveyors are not configured so much for the transfer of material from one to another, as for rotating the compartments for convenience in loading and unloading.

U.S. Pat. No. 2,415,201 issued on Feb. 4, 1947 to Erich R. Zademach et al., titled "Rotary Conveyor," describes a single, circular conveyor having a toroid configuration. The conveyor surface thus does not extend completely across the span of the Zademach et al. conveyor, and no means is provided to link a series of such conveyors together in a synchronized drive system, as provided by the present rotary conveyor system.

U.S. Pat. No. 3,061,074 issued on Oct. 30, 1962 to Albert Musschoot, titled "Rotary Conveyor," describes a single rotary disc for redistributing loose material from an input chute to an output chute. A diverter blade extends from the center to one edge of the disc, but the diverter blade is stationary relative to the rotary motion of the disc. No multiple discs having a synchronous drive system are disclosed by Musschoot.

U.S. Pat. No. 3,125,210 issued on Mar. 17, 1964 to Charles E. Sheetz, titled "Rotary Fruit Handling Apparatus," describes a rotary distribution system which accepts articles from an overhead linear conveyor and distributes them to the periphery of the rotary devices. The only conveyor apparatus in the Sheetz machine is the overhead linear conveyor. Also, the Sheetz rotary elements are formed of two concentric discs separated by opposed spiral panels. The two concentric discs rotate at different speeds relative to one another. While Sheetz shows a pair of rotary disc assemblies in his machine, this is only to provide additional handling stations. The Sheetz machine is not truly a rotary conveyor, as it does not transmit material from one rotary assembly to another.

U.S. Pat. No. 3,360,104 issued on Dec. 26, 1967 to Herbert S. Winfield, titled "Parcel Distribution And Display System," describes a carousel type airline passenger baggage handling system. Multiple carousels are shown, but each has a separate linear feed conveyor or chute, and none of the carousels communicate with one another. The carousels are stand-alone devices, rather than being set into a stationary unit or pan, as is the case with the present rotary disc conveyor system.

U.S. Pat. No. 3,848,724 issued on Nov. 19, 1974 to Wilber C. Belk, titled "Accumulator For Fragile Articles," describes a single turntable having a depressed center, for accumulating articles. When sufficient articles have collected on the turntable, the table is tilted to dump the articles on a linear conveyor. Only a single rotary disc is disclosed by Belk, with no communication between plural rotary conveyor discs as provided by the present system.

U.S. Pat. No. 4,056,189 issued on Nov. 1, 1977 to Donald L. Freed, Jr., titled "Material Gathering Device For A Mining Machine," describes a cutting drum disposed at the end of a boom, with a series of rotary discs positioned behind the cutting drum for transferring ore from the cutting drum to a conveyor extending along the boom. The rotary discs rotate in opposite directions to one another, in order to move the material centrally between the two center discs and laterally off the disc assembly to the conveyor. In contrast, the present system rotates all of the discs in the same direction, to convey material along the length of the present disc conveyor.

U.S. Pat. No. 4,078,649 issued on Mar. 14, 1978 to Ole Prydtz, titled "Conveyor Systems," describes a complex mechanism for laterally displacing and rotating a series of conveyor discs in an overlapping assembly. The discs are sequentially displaced from their alignment as they are drawn along the conveyor chain, whereupon they rotate to displace an article(s) carried thereon until returned to their aligned positions. The present rotary disc conveyor system differs considerably from the Prydtz mechanism, in that in the present system: (1) the discs do not overlap; (2) each pair of discs is secured in its own pan or carrier, with a series of such pans or carriers being assembled together to form the conveyor of the present invention; (3) the discs are not displaced from their relatively fixed locations in their respective pans or carriers; (4) the discs of the present system rotate generally synchronously and continuously; (5) the present system includes a series of transfer vanes or blades atop each disc to urge the material from disc to disc; and (6) the present system is rotationally and directionally reversible.

U.S. Pat. No. 4,150,520 issued on Apr. 24, 1979 to Angelo Palmieri et al., titled "Device For Feeding Articles," describes a device for sorting candies for distribution to a wrapping machine. The Palmieri et al. mechanism includes a pair of separated discs, but each of the discs has pockets for containing individual candies; such pockets teach away from the necessarily flat surfaces of the present discs. Moreover, a separate, relatively complex transfer mechanism is required to move candies from one disc to the other, unlike the present invention.

U.S. Pat. No. 4,159,055 issued on Jun. 26, 1979 to William R. Eberle, titled "Gathering Head," describes a rotary disc transfer assembly for transferring ore dislodged from a seam by a mining machine, to a conveyor extending back of the mining machine. FIG. 8 of the Eberle issued patent illustrates a four disc assembly which more closely resembles the device of the Freed '189 U.S. Patent discussed further above, than it does the present invention. The same points of difference between the Freed mechanism and the present invention, i.e., the opposite direction of rotation of discs to either side of the center in order to convey ore laterally from the mining machine and gathering head to a conveyor extending generally normal thereto, are seen to apply here as well.

U.S. Pat. No. 4,662,508 issued on May 5, 1987 to Shinichi Inoue et al., titled "Product Feeding Device For Combination Weighing Machine," describes a distribution system comprising a series of overlapping discs which distribute a product from one side thereof to the opposite side. A corresponding series of fixed fences assists in guiding the product across the line of discs, to the exit side. As in the cases of the devices of the Freed '189 and Eberle '055 U.S. Patents, the Inoue et al. mechanism is not truly a conveyor system, as it does not convey anything along the length of the overlapping discs, but rather transfers material from an entry side of the line of discs, to the opposite exit side. The fixed fences and lack of lateral retaining walls of the Inoue et al. mechanism render it incapable of conveying material along its length.

U.S. Pat. No. 4,671,707 issued on Jun. 9, 1987 to Stanley R. Vancelette et al., titled "Disc Transfer Mechanism For Electrical Component Assembly Machine," describes an apparatus having a series of spaced apart discs thereon. The discs accept electronic components from one side of the line, and rotate through a partial revolution to place the components on a conveyor. The Vancelette et al. apparatus is thus not a conveyor per se, but rather a handling device for transferring objects from one side of the device to a conveyor on the opposite side, which then conveys the objects to another location. The Vancelette et al. mechanism thus has more in common with the transfer or handling mechanisms of the Freed '189, Eberle '055, and Inoue et al. '508 U.S. Patents, than it does with the present rotary disc conveyor system.

U.S. Pat. No. 5,535,999 issued on Jul. 16, 1996 to Anthony D. Ford, titled "Apparatus For Rotating A Flat Article Through A Desired Angular Orientation," describes a conveyor system having a series of widely spaced discs extending from the plane thereof. As the discs travel along the bottom run of the conveyor, they grip articles carried on another conveyor therebelow. The discs are rotated through a partial revolution to align the carried articles as desired on the lower conveyor. The Ford conveyor mechanism thus more closely resembles the apparatus of the '707 U.S. Patent to Vancelette et al. than it does the present rotary disc conveyor system.

U.S. Pat. No. 5,634,545 issued on Jun. 3, 1997 to Roger D. Plumley, titled "Apparatus For Continuously Conveying Coal From A Continuous Mining Machine To A Remote Floor Conveyor," describes a linear conveyor system formed of a series of interconnected endless linear belts. The assembly includes motive power for repositioning as desired. The Plumley apparatus is closely related to such mechanisms used in the coal mining industry at present. The present rotary disc conveyor system, in contrast, is configured to operate along the face wall of a longwall continuous mining operation, and convey coal to a linear conveyor for conveyance from the mine.

U.S. Pat. No. 5,927,468 issued on Jul. 27, 1999 to Carlo Corniani et al., titled "Method And Unit For Orienting Pump-Operated Caps," describes a bottle capping machine. The machine includes a pair of wheels or discs which rotate opposite one another, and which grip bottles about the disc peripheries. No means is disclosed by Corniani et al. for conveying material atop a series of such discs.

U.S. Patent Publication No. 2002/96,934 published on Jul. 25, 2002, titled "Mining Machine And Method Of Mining," describes a system wherein a continuous mining machine mines a roadway tunnel into the ore seam, with a pair of augers mining a series of tunnels lateral to the roadway. The coal is carried from the mine on conventional chain and belt conveyors. The publication makes no disclosure of any form of rotary disc conveyor system.

Japanese Patent No. 58-100,033 published on Jun. 14, 1983, titled "Coal Throwing In Device Of Storage Tank," describes (according to the drawings and English abstract) a rotating conveyor system for distributing coal evenly within a cylindrical storage tank or container. The conveyor system itself is an extendible linear device, with no rotary disc components. However, the linear conveyor may be rotated about a vertical axis extending through the center of the tank, to distribute coal evenly about the sides of the tank rather than creating a mound of coal in the center of the tank.

Finally, German Patent No. 3,726,450 published on Mar. 2, 1989, titled "Device For Loading Saggers With Ceramic Material Or For Unloading The Ceramic Material From The Saggers," describes (according to the drawings and English abstract) a linear and rotary conveyor system for use in the ceramics industry. "Saggers" (fireproof containers) are loaded with ceramic articles to be fired, and emptied after firing, by means of the conveyor system of the '450 German Patent Publication. However, the conveyor system uses only a single rotary component in making a 180° change of direction during the loading and unloading of the "saggers." No continuous, linear conveyor system comprising a series of rotary discs is provided in the '450 German Patent Publication.

None of the above inventions and patents, taken either singly or in combination, is seen to describe the instant invention as claimed. Thus a rotary disc conveyor system solving the aforementioned problems is desired.

SUMMARY OF THE INVENTION

The present rotary disc conveyor system comprises a series of units or pans, with each pan preferably containing a pair of rotary discs which rotate unidirectionally and simultaneously to convey material along the length of the pan assembly, from pan to pan. The discs preferably each include a series of vanes extending upwardly therefrom for greater efficiency in transferring the material from disc to disc. Stationary fences or guides may be placed between adjacent sides of each of the discs, to provide better control of flow direction for the material being conveyed.

The rotary disc conveyor system is particularly well suited for replacing the conventional chain conveyor system used in longwall coal mining for the conveyance of loose coal from the mining machine along the face of the wall to another conveyor or means of transporting the coal to the surface. The conveyor system may include a series of drive motors (electric or hydraulic) and interconnected drive lines, thereby assuring continued operation when any one disc or drive fails. Conventional chain conveyors require the operation to be shut down when a single link breaks. The provision of multiple pans joined together end-to-end can provide a rotary disc conveyor system which may extend for up to a thousand feet along the face of a longwall mining operation. However, the present conveyor system may also be scaled for adoption to other operating environments and applications, as well.

These and other features of the present invention will become readily apparent upon further review of the following specification and drawings.

BRIEF DESCRIPTION OF THE DRAWINGS

FIG. 6 is a side elevation view in section of another embodiment of a single pan or section of the present conveyor, illustrating a shaft and gearbox drive therefor.

FIG. 7 is a side elevation view in section of a further embodiment of a single pan or section of the present conveyor, illustrating an electric or hydraulic drive therefor.

Similar reference characters denote corresponding features consistently throughout the attached drawings.

DETAILED DESCRIPTION OF THE PREFERRED EMBODIMENTS

The present invention comprises various embodiments of a rotary disc conveyor system, in which a series of discs rotate on a series of conveyor pans to transfer material from disc to disc along the length of the conveyor pan assembly. The present conveyor system may be adapted to virtually any application or environment where a conveyor is required to transfer material from one point to another, but is particularly well suited for use in the underground mining industry, for conveying coal or other ore from a longwall mining machine along the face of the wall to another conveyor or other transport for removal from the mine.

Figure 1:
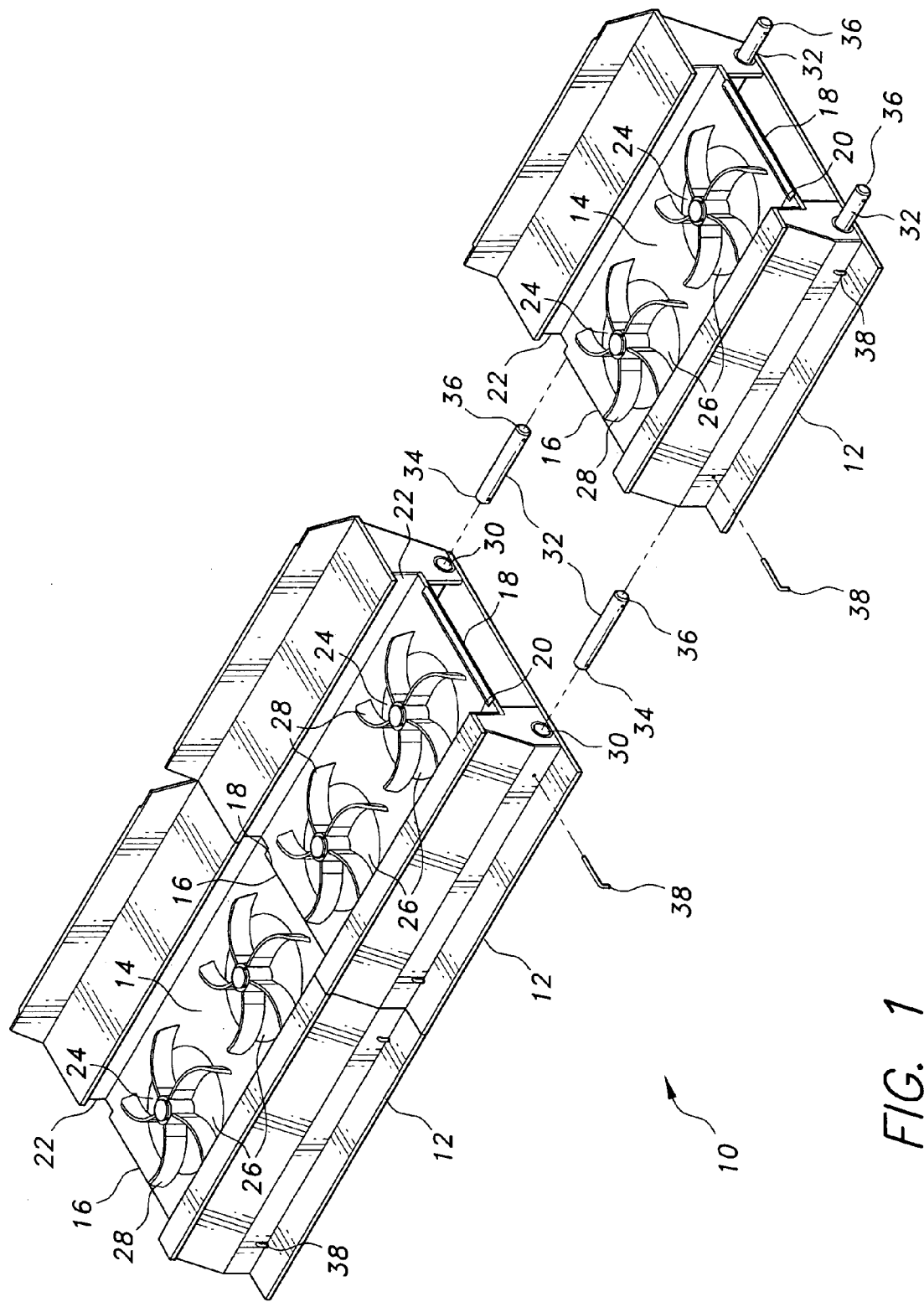
FIG. 1 is an exploded perspective view of a series of pans or sections of a rotary disc conveyor system according to the present invention, showing its general configuration.

FIG. 1 of the drawings provides an exploded perspective view of a series of conveyor units or pans, showing their assembly to form the rotary disc conveyor system 10 of the present invention. The series of pans 12 are joined together to form a continuous run as required. In the underground mining industry, such pans may be constructed to have lengths on the order of six feet or so, with a large number of pans being assembled to form a run of perhaps as much as a thousand feet or so, depending upon the environment of installation and other factors. Each pan 12 essentially comprises a generally rectangular configuration having a flat, level conveyor surface 14 defined by a first end 16, an opposite second end 18, a first lateral wall 20, and an opposite second lateral wall 22 extending upwardly along the opposed lateral edges of the conveyor surface 14.

Figure 5:
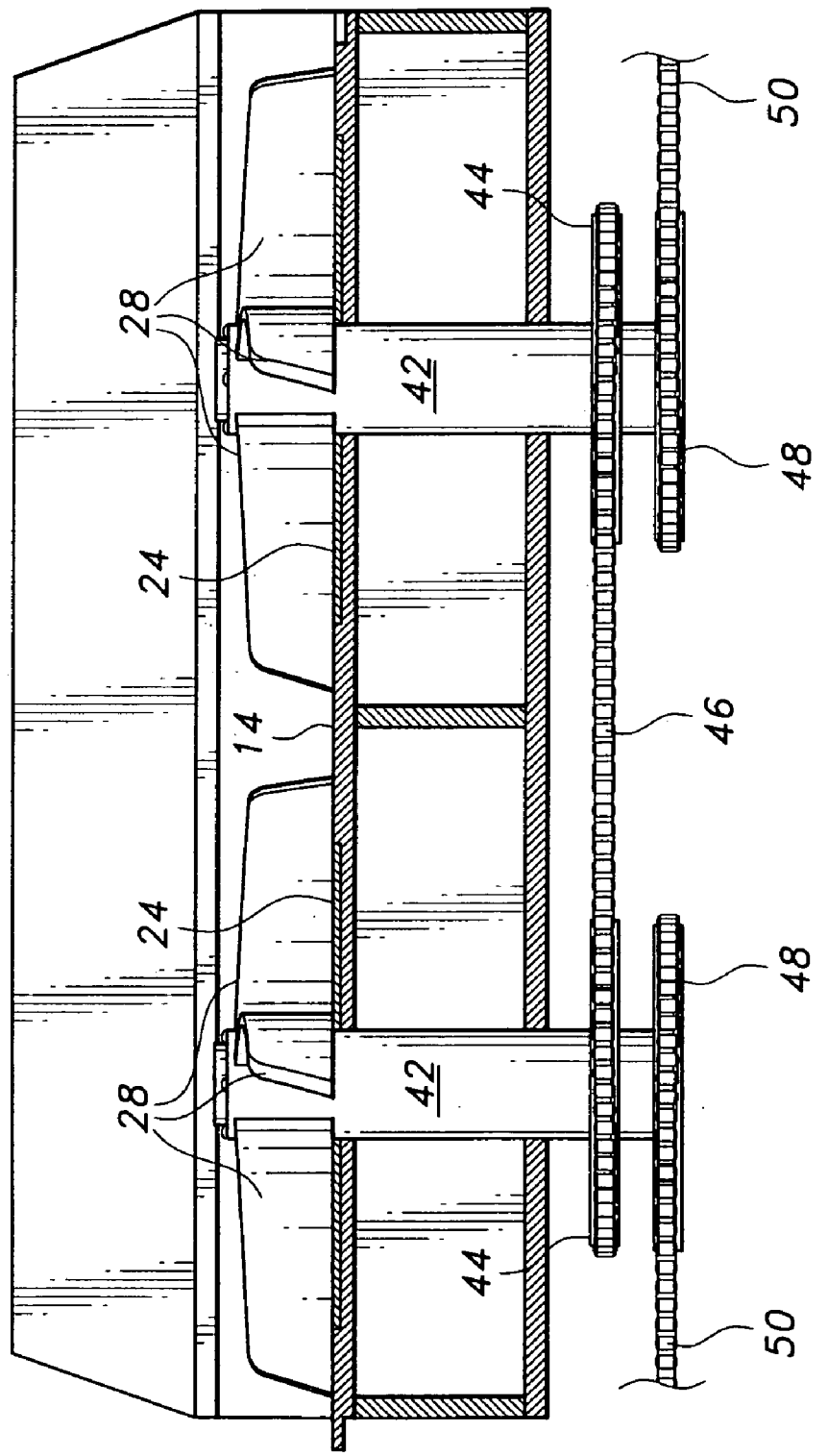
FIG. 5 is a side elevation view in section of a single pan or section of the present conveyor, illustrating a roller chain drive therefor.

Each of the conveyor pans 12 includes at least one, and preferably two, rotary conveyor discs 24 installed thereon. Each disc 24 has a flat, level upper surface 26 which is coplanar with the conveyor surface 14 of the respective pan 12 in which it is installed. The discs 24 are powered by a drive system, various embodiments of which are illustrated in FIGS. 5 through 7 and discussed in detail further below, which results in all of the discs 24 of the conveyor line 10 rotating simultaneously and unidirectionally (e.g., counter-clockwise when viewed from above), when power is applied to the system. Preferably, the drive system rotates all of the discs 24 at the same rotational velocity, so their rotations are synchronous with one another.

The upper surface 26 of each of the discs 24 includes a plurality of sweeper vanes 28 extending upwardly therefrom, immovably affixed to each disc 24 in a generally radial array from the center of each disc 24. The vanes 28 serve to sweep the coal or other material along the conveyor pans 12, by means of the rotation of the discs 24. Each of the vanes 28 is preferably curved along its generally radial orientation. This curvature assists in sweeping the conveyed material outwardly along the sweepback of the vanes 28, and throws the material from one disc 24 to the next. The outboard ends of the vanes 28 pass quite close to their counterparts of adjacent conveyor discs 24 and to the opposed lateral walls 20 and 22 of their respective conveyor pans 12, in order to provide the desired efficiency in moving the coal or other material along the length of the conveyor run 10.

Figure 2:
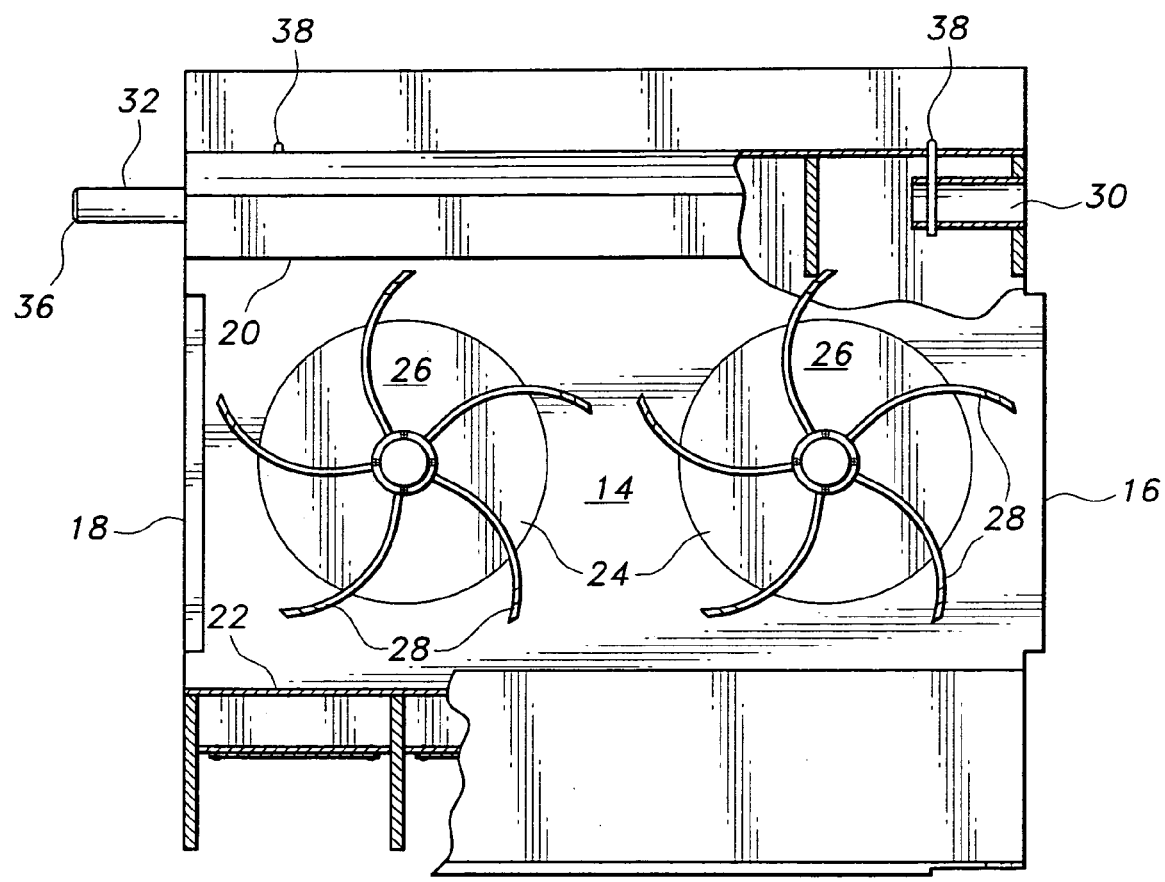
FIG. 2 is a partially broken away top plan view of a single pan or section of the present conveyor system, showing further details thereof.

A series of conveyor units or pans 12 may be joined together to form a conveyor run 10, as noted further above. FIGS. 1 and 2 illustrate the means provided for joining the pans 12 together to form such a conveyor run. Each of the pans 12 includes a pair of connector sockets 30 disposed in each end 16 and 18 thereof, essentially below the corresponding lateral walls 20 and 22. A corresponding plurality of conveyor pan connector shafts 32 are installed in the corresponding sockets 30 of adjoining conveyor pans 12, with each of the shafts 32 having opposed first and second ends 34 and 36. The shafts 32 are retained within the sockets 30 by a lateral retainer pin 38 inserted through corresponding lateral passages aligned through the sides of the pans 12, through the sockets 30, and through the two ends 34 and 36 of the connector shafts 32 when they are completely installed.

As the series of conveyor discs 24 and the vanes or blades 28 affixed thereto are rotated, material (coal, etc.) is pushed from the blades or vanes 28 of one disc 12 to the next set of vanes 28 of the next disc 12, continuing in this manner to push or carry the conveyed material along the length of the pan assembly comprising a conveyor run 10 of the present invention. It will be noted that since the discs 24 and their vanes 28 rotate within the stationary conveyor pans 12, there is no net motion of any of the components of the present rotary disc conveyor system toward either end of a conveyor assembly 10. Thus, so long as the path of any material being conveyed is symmetrical, i.e., no guides or fences are applied to either side of the system, there will be no net movement of material.

Figure 3:
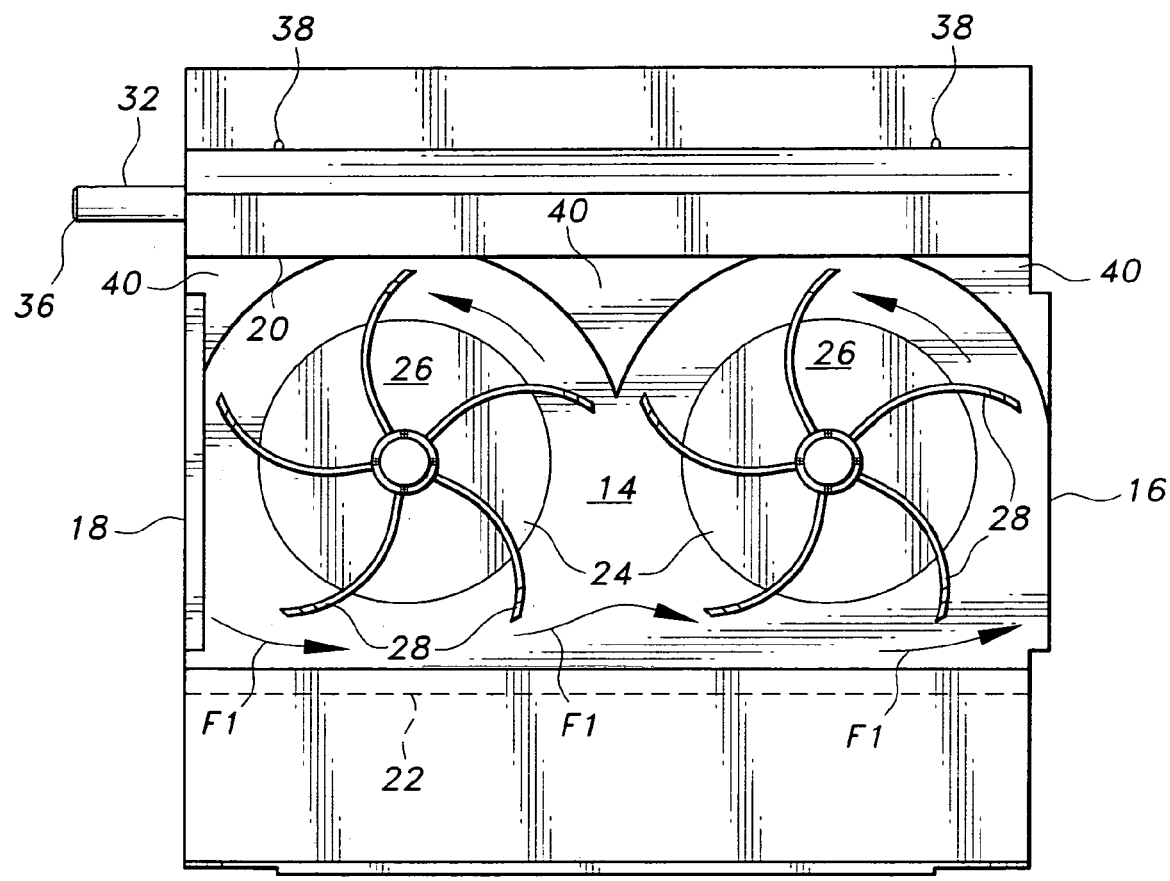
FIG. 3 is a top plan view of a single pan or section of the present conveyor system, including a series of first side guide fences for control of material flow along the conveyor line.
Figure 4:
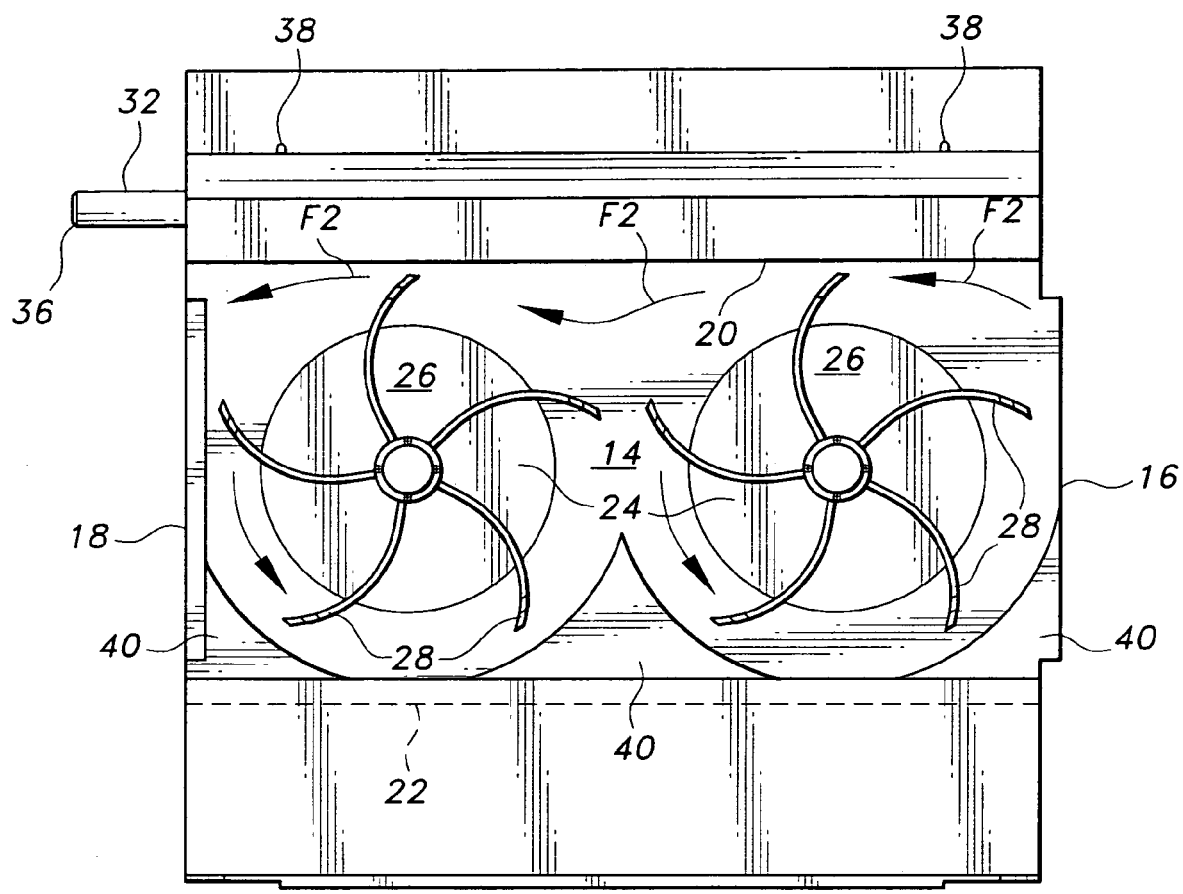
FIG. 4 is a top plan view of a single pan or section of the present conveyor system, including a series of second side guide fences for flow control in the direction opposite that of FIG. 3.

Accordingly, the present rotary disc conveyor system provides for the adjustable and removable installation of a series of backflow prevention guides 40 along either side or wall 20 or 22 of the assembly 10, as shown in FIGS. 3 and 4 of the drawings. Assuming the discs 24 are rotating counterclockwise in the views of FIGS. 3 and 4, i.e., with the swept back outer portions of the sweeper vanes 28 trailing in rotation, the placement of such backflow prevention guides 40 along either wall 20 or 22 will tend to block reversionary flow along that wall.

In FIG. 3, a series of guides 40 is installed along the first wall 20 of the conveyor pan unit 12. Each of the guides 40 has a flat wall face with opposed concave arcuate outward faces fitting closely adjacent the paths of the outer tips of the rotating vanes 28, thus forming a generally triangular shape with two concave sides. It will be understood that the two outer guides 40 of FIGS. 3 and 4 may be truncated as shown to match the first and second edges 16 and 18 of the conveyor pan unit 12, or may be complete units which extend across the mating edges 16 and 18 of connected pans 12. When the guides 40 are installed and the discs 24 and their attached sweeper vanes 28 are rotated as shown in FIG. 3, the vanes 28 push or sweep the conveyed material along the second wall 22, where there are no guides 40 to block the flow. However, any material swept around the discs 24 and vanes 28 adjacent the opposite first wall 20, is blocked by the guides 40. Such material is swept back around the path of the discs 24 and vanes 28, to be pushed or swept from left to right along the second wall 22, in accordance with the flow arrows F1.

FIG. 4 is quite similar to FIG. 3, with the exception of the location of the backflow prevention guides. In FIG. 4, the guides 40 are installed along the second wall 22, and prevent backflow from left to right along the second wall 22. Accordingly, conveyed material can only flow along the first wall 20, generally in accordance with the right to left flow arrows F2 shown in FIG. 3. It will be seen that material flow may be reversed either by switching the locations of the guides 40 from one wall to the opposite wall, as shown in FIGS. 3 and 4, or by reversing the direction of rotation of the discs 24 and their attached vanes 28. However, the rotation of the discs 24 and vanes 28 in a clockwise direction, i.e., with the concave faces of the vanes 28 leading, is less efficient, as this tends to scoop material inwardly, rather than tossing the material outwardly to be conveyed along one of the walls of the conveyor pan 12. However, centrifugal reaction will tend to toss the conveyed material outwardly away from the centers of the discs 24 in any event.

Some means must be used to provide rotary power to the discs 24 of the present rotary disc conveyor system. The drive system used is not critical, so long as it provides sufficient power to propel a series of conveyor discs 24 in a conveyor pan assembly 10, which may comprise a large number of such pans 12. FIGS. 5 through 7 provide illustrations of exemplary drive systems which may be used with the present conveyor system invention, as desired. A single drive input, or multiple inputs, may be provided as desired.

FIG. 5 provides an elevation view in section of an exemplary conveyor pan 12 employing a mechanical roller chain and sprocket drive system. In FIG. 5, each of the rotary disc drive shafts 42 has a disc pair linking sprocket 44 just above its lower end, with a disc pair linking roller chain 46 connecting the two sprockets 44 together. Additional drive transmission sprockets 48 are provided at the lower ends of each shaft 42, and are driven by inter-pan roller chains 50. While this system may be continued as shown to drive a large number of conveyor discs 24 in a relatively long assembly of conveyor pans 12, this would require relatively heavy chain and sprocket assemblies for at least the portion of the system closest to the drive means. Preferably, a series of smaller drive motors (not shown, but conventional hydraulic or electric motors) is provided, with one such motor driving a disc drive shaft 42 at every few pans 12, with the load being distributed and the rotational speeds being synchronized by a chain and sprocket mechanism as shown in FIG. 5.

FIG. 6 provides an illustration of another drive system embodiment, comprising a rotary mechanical drive shaft and transmission system. In FIG. 6, each of the disc drive shafts 42 includes a gearbox 52 at its lower end. The gearboxes 52 may provide rotational speed reduction as well as changing the drive direction. The two gearboxes 52 of each conveyor pan 12 may be interconnected by an intermediate drive shaft 54, with outboard shafts 56 connecting adjoining pans 12 by means of universal joints 58, or constant velocity joints or other suitable means.

FIG. 7 illustrates yet another drive system, or rather systems, as the configuration shown in FIG. 7 may be electrically or hydraulically powered. As in the case of the drive configurations of FIGS. 5 and 6, each of the conveyor discs 24 includes a rotary drive shaft 42 extending downwardly therefrom, with some form of drive means providing rotary power to each of the drive shafts 42. Each of the drive shafts 42 includes some form of drive motor 60 at its lower end, with the drive motor 60 being either a conventional electric motor or a conventional hydraulic motor. Power transmission lines 62a and 62b extend between each motor 60 in each conveyor pan 12, with pan interconnecting lines 64a and 64b extending between each of the pans 12. When electric motors are used to provide power to the embodiment of FIG. 7, the power transmission lines 62a through 64b of course comprise insulated electric cables. When the motors 60 are hydraulic, the power transmission lines 62a through 64b are of course hydraulic fluid lines.

In conclusion, the rotary disc conveyor system in its various embodiments provides a superior system for conveying loose materials from one point to another, in comparison to conventional conveyor systems. The conveyor system is particularly well suited for use in conveying loose coal from the mining head to another conveyor or transport device for removal from the mine in a longwall mining operation, but is readily adaptable for use in the manufacturing industry and/or other applications and environments as well.

The conveyor system eliminates the face chain conventionally used in longwall mining conveyor systems, and thus eliminates the relatively frequent breakage and down time and lost production revenue associated with such breakage. The conveyor system may utilize a single large hydraulic or electric motor for power, but unlike conventional longwall conveyor systems, the present system may be powered by a series of smaller motors, if so desired. The advantage of such a multiple motor system is that in the event that a single motor or drive means is lost, the system can still operate, with other interlinked drive systems providing the required motive force. Moreover, the replacement of a single pan unit is quickly and easily accomplished with the present invention, in the event that such replacement is needed.

The system is also quieter and more efficient than conventional longwall conveyor systems, and produces less dust from material being conveyed thereon. The rotary action of the discs of the present conveyor system also result in less wear on mechanical components, than conventional longwall mining chain conveyor systems. The rotary disc conveyor system will thus prove to be a welcome addition to the mining industry, which will pay for itself over its initial period of operation.

It is to be understood that the present invention is not limited to the embodiments described above, but encompasses any and all embodiments within the scope of the following claims.

I claim:

1. A rotary disc conveyor system, comprising:
   a plurality of stationary conveyor pans, each of the pans having a flat, level conveyor surface, a first end, and a second end opposite said first end;
   at least one rotary conveyor disc disposed upon each of the pans, said at least one disc having a flat, level upper surface coplanar with the conveyor surface of each of the pans; and
   a drive system interconnecting each said disc and selectively driving each said disc simultaneously and unidirectionally relative to one another.

2. The rotary disc conveyor system according to claim 1, wherein said at least one disc of each of said pans comprises a plurality of discs disposed upon each of said pans, each of said discs of each of said pans being interconnected by said drive system and being selectively driven simultaneously and unidirectionally relative to one another.

3. The rotary disc conveyor system according to claim 1, further including a plurality of sweeper vanes extending upwardly from said upper surface of each said disc, and immovably affixed thereto.

4. The rotary disc conveyor system according to claim 3, wherein each of said sweeper vanes is radially curved.

5. The rotary disc conveyor system according to claim 1, further including:
   a plurality of connector sockets disposed in each said end of each of said pans;
   a conveyor pan connector shaft removably disposed in each of said connector sockets, each said connector shaft having a first end and a second end opposite said first end; and
   at least one of retainer pin removably disposed laterally through each said end of each of said pans and each said end of each said connector shaft.

6. The rotary disc conveyor system according to claim 1, further including:
   opposed first and second lateral walls extending upwardly from each of said pans; and
   a generally triangular backflow prevention guide extending between each said disc from one of said lateral walls of each of said pans.

7. The rotary disc conveyor system according to claim 1, wherein said drive system is selected from the group consisting of roller chains and sprockets, rotary drive shafts and gearboxes, hydraulically powered systems, and electrically powered systems.

8. A rotary disc conveyor system, comprising:
   a plurality of stationary conveyor pans, each of the pans having a flat, level conveyor surface, a first end, and a second end opposite said first end;
   at least two rotary conveyor discs disposed upon each of the pans, each of said discs having a flat, level upper surface coplanar with the conveyor surface of each of the pans; and
   a drive system interconnecting each of said discs and selectively driving each of said discs simultaneously and unidirectionally relative to one another.

9. The rotary disc conveyor system according to claim 8, further including:
   a plurality of connector sockets disposed in each said end of each of said pans;
   a conveyor pan connector shaft removably disposed in each of said connector sockets, each said connector shaft having a first end and a second end opposite said first end; and
   at least one retainer pin removably disposed laterally through each said end of each of said pans and each said end of each said connector shaft.

10. The rotary disc conveyor system according to claim 8, further including a plurality of sweeper vanes extending upwardly from said upper surface of each said disc, and immovably affixed thereto.

11. The rotary disc conveyor system according to claim 10, wherein each of said sweeper vanes is radially curved.

12. The rotary disc conveyor system according to claim 8, further including:
   opposed first and second lateral walls extending upwardly from each of said pans; and
   a generally triangular backflow prevention guide extending between each said disc from one of said lateral walls of each of said pans.

13. The rotary disc conveyor system according to claim 8, wherein said drive system is selected from the group consisting of roller chains and sprockets, rotary drive shafts and gearboxes, hydraulically powered systems, and electrically powered systems.

14. A rotary disc conveyor system, comprising:
- a plurality of stationary conveyor pans, each of the pans having a flat, level conveyor surface, a first end, and a second end opposite said first end;
- at least two rotary conveyor discs disposed upon each of the pans, each of said discs having a flat, level upper surface coplanar with the conveyor surface of each of the pans; and
- a drive system interconnecting each of said discs and selectively driving each of said discs simultaneously, unidirectionally, and synchronously relative to one another.

15. The rotary disc conveyor system according to claim 14, further including:
- a plurality of connector sockets disposed in each said end of each of said pans;
- a conveyor pan connector shaft removably disposed in each of said connector sockets, with each said connector shaft having a first end and a second end opposite said first end; and
- at least one retainer pin removably disposed laterally through each said end of each of said pans and each said end of each said connector shaft.

16. The rotary disc conveyor system according to claim 14, further including a plurality of sweeper vanes extending upwardly from said upper surface of each said disc, and immovably affixed thereto.

17. The rotary disc conveyor system according to claim 16, wherein each of said sweeper vanes is radially curved.

18. The rotary disc conveyor system according to claim 14, further including:
- opposed first and second lateral walls extending upwardly from each of said pans; and
- a generally triangular backflow prevention guide extending between each said disc from one of said lateral walls of each of said pans.

19. The rotary disc conveyor system according to claim 14, wherein said drive system is selected from the group consisting of roller chains and sprockets, rotary drive shafts and gearboxes, hydraulically powered systems, and electrically powered systems.

* * * * *